(12) United States Patent
Perez et al.

(10) Patent No.: US 11,138,809 B2
(45) Date of Patent: Oct. 5, 2021

(54) METHOD AND SYSTEM FOR PROVIDING AN OBJECT IN VIRTUAL OR SEMI-VIRTUAL SPACE BASED ON A USER CHARACTERISTIC

(71) Applicant: Microsoft Technology Licensing, LLC, Redmond, WA (US)

(72) Inventors: Carlos G. Perez, Seattle, WA (US); Vidya Srinivasan, Issaquah, WA (US); Colton B. Marshall, Redmond, WA (US); Aniket Handa, Seattle, WA (US); Harold Anthony Martinez Molina, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/571,646

(22) Filed: Sep. 16, 2019

(65) Prior Publication Data

US 2020/0013236 A1 Jan. 9, 2020

Related U.S. Application Data

(63) Continuation of application No. 15/636,321, filed on Jun. 28, 2017, now Pat. No. 10,453,273.
(Continued)

(51) Int. Cl.
*G06T 19/20* (2011.01)
*A63F 13/63* (2014.01)
(Continued)

(52) U.S. Cl.
CPC .............. *G06T 19/20* (2013.01); *A63F 13/63* (2014.09); *G06F 3/011* (2013.01); *G06F 3/012* (2013.01);
(Continued)

(58) Field of Classification Search
None
See application file for complete search history.

(56) References Cited

U.S. PATENT DOCUMENTS 7,117,450 B1 * 10/2006 Chaudhri ............ G06F 3/04847
715/787
2016/0125655 A1 * 5/2016 Tian ........................ G06T 11/00
345/633
(Continued)

FOREIGN PATENT DOCUMENTS

| RU | 2014125226 A | 12/2015 |
|----|---|---|
| RU | 168332 U1 | 1/2017 |
| WO | 2015185579 A1 | 12/2015 |

OTHER PUBLICATIONS

Michel, "AmiAr—Smart Home Augmented Reality on a Smartphone", published on Apr. 24, 2017, screenshots retrieved from https://www.youtube.com/watch?v=_un8dfGPpNA.*

(Continued)

*Primary Examiner* — Zhengxi Liu

(57) ABSTRACT

A method, system, and computer program, for providing the virtual object in the virtual or semi-virtual environment, based on a characteristic associated with the user. In one example embodiment, the system comprises at least one computer processor, and a memory storing instructions that, when executed by the at least one computer processor, perform a set of operations comprising determining the characteristic associated with the user in the virtual or semi-virtual environment with respect to a predetermined reference location in the environment, and providing a virtual object based on the characteristic.

20 Claims, 10 Drawing Sheets

Related U.S. Application Data

(60) Provisional application No. 62/489,904, filed on Apr. 25, 2017.

(51) Int. Cl.
| | |
|---|---|
| *G06T 15/20* | (2011.01) |
| *G06F 16/11* | (2019.01) |
| *G06F 3/01* | (2006.01) |
| *G06F 3/0481* | (2013.01) |
| *G06T 19/00* | (2011.01) |
| *G06F 3/0484* | (2013.01) |

(52) U.S. Cl.
CPC ........ *G06F 3/04815* (2013.01); *G06F 16/122* (2019.01); *G06T 15/20* (2013.01); *G06T 15/205* (2013.01); *G06T 19/006* (2013.01); *G06F 3/04842* (2013.01); *G06T 2200/24* (2013.01); *G06T 2215/16* (2013.01); *G06T 2219/2016* (2013.01)

(56) References Cited

U.S. PATENT DOCUMENTS

| | | | |
|---|---|---|---|
| 2016/0180595 A1 | 6/2016 | Grossinger et al. | |
| 2016/0217623 A1* | 7/2016 | Singh | G09G 5/00 |
| 2017/0169616 A1* | 6/2017 | Wiley | G06T 19/006 |

OTHER PUBLICATIONS

"Non Final Office Action Issued in U.S. Appl. No. 15/636,359", dated Oct. 24, 2019, 26 Pages.
"Office Action Issued in European Patent Application No. 18722795.4", dated Oct. 30, 2020, 7 Pages.
"Office Action Issued in European Patent Application No. 18723617.9", dated Nov. 2, 2020, 9 Pages.
"Office Action Issued in European Patent Application No. 18724376.7", dated Dec. 11, 2020, 6 Pages.
Diverdi, et al., "Level of Detail Interfaces", In Proceedings of the Third IEEE and ACM International Symposium on Mixed and Augmented Reality, Nov. 5, 2004, 2 Pages.
"Office Action Issued in Chile Patent Application No. 201902951", dated Jan. 14, 2021, 12 Pages.
"Summons to Attend Oral Proceedings Issued in European Patent Application No. 18722795.4" Mailed Date: Mar. 12, 2021, 11 Pages.
"Office Action and Search Report Issued in Chile Patent Application No. 201902950", dated Apr. 15, 2021, 14 Pages.
"Office Action and Search Report Issued in Chile Patent Application No. 201902951", dated Apr. 15, 2021, 12 Pages.
"Summons to Attend Oral Proceedings Issued in European Patent Application No. 18723617.9", dated May 14, 2021, 13 Pages.
"Office Action and Search Report Issued in Chile Patent Application No. 201902950", dated Jul. 21, 2021, 12 Pages.
"Office Action issued in Russian Patent Application No. 2019137607", dated Jul. 12, 2021, 18 Pages.

\* cited by examiner

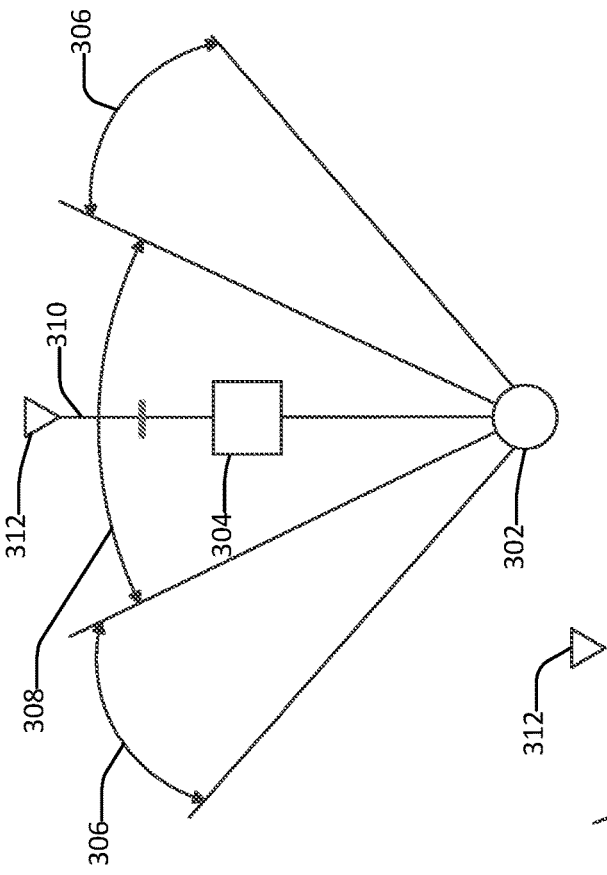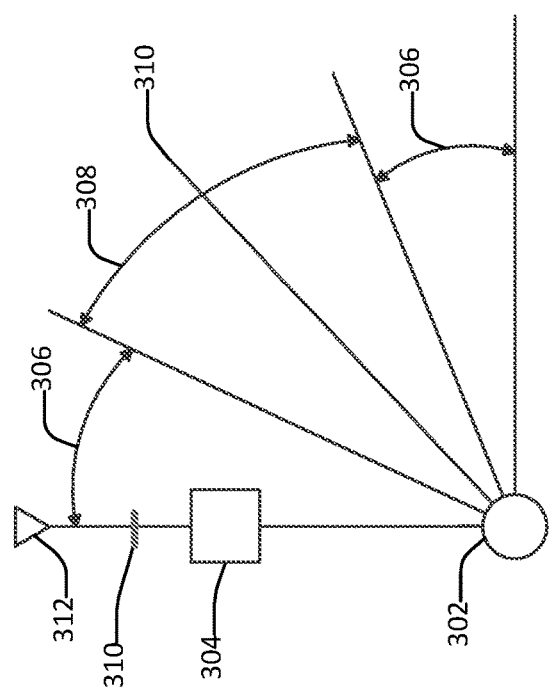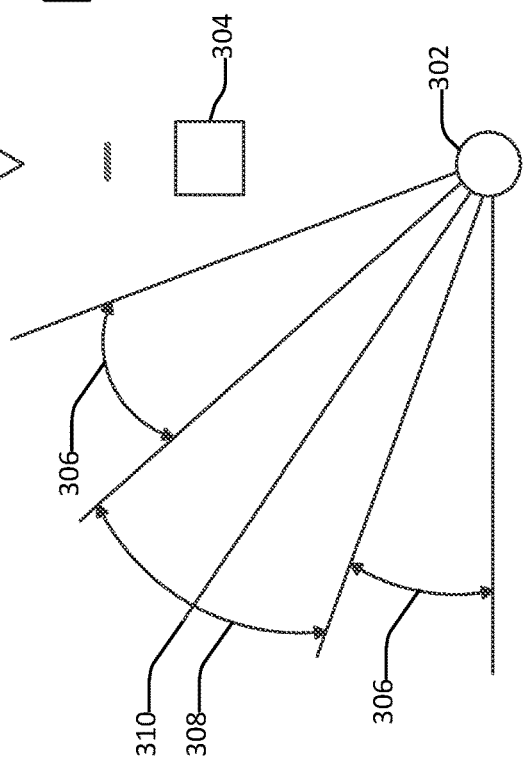

METHOD AND SYSTEM FOR PROVIDING AN OBJECT IN VIRTUAL OR SEMI-VIRTUAL SPACE BASED ON A USER CHARACTERISTIC

CROSS-REFERENCE TO RELATED APPLICATIONS

This application is a continuation of U.S. patent application Ser. No. 15/636,321, filed Jun. 28, 2017, entitled "Method and System for Providing an Object in Virtual or Semi-Virtual Space Based on a User Characteristic" now U.S. Pat No. 10,453,273, issued Oct. 22, 2019, which claims the benefit of U.S. Provisional Application No. 62/489,904, filed Apr. 25, 2017, the entire disclosures of which are hereby incorporated by reference herein.

BACKGROUND

Publishing sites have been a key way to share and consume information on the web. A handful of services exist that democratize web site creation. However, services do not exist to solve the problem of creating sites that realize the full potential of 3D content. With an increasing push to create easy 3D content, there is a need for tools and/or services to facilitate the consumption of the 3D content. For instance, moving within a virtual world through the use a virtual reality device is often challenging. In some cases, users may not understand how to utilize or interact with the virtual world. Further, automatically moving the user through the virtual world can be difficult to accomplish and may cause discomfort or motion sickness of the user.

One difference in a 2D versus 3D user experience is an immersion aspect that the 3D user experience provides. 3D objects move, animate, and change form in the virtual world, or in semi-virtual worlds such as augmented reality and mixed reality worlds. Traditionally, a user would have to carefully design all possible states and behaviors that can be associated with a 3D object. However, most users do not have necessary expertise to design correct 3D object views and/or interfaces and to operate them. Additionally, users often do not have the ability or expertise to enable them to operate objects, such as user interfaces, in such worlds, particularly when the user is displaced from the applicable object(s).

It is with respect to these and other general considerations that embodiments have been described. Also, although relatively specific problems have been discussed, it should be understood that the embodiments should not be limited to solving the specific problems identified in the background.

SUMMARY

The present application relates generally to virtual or semi-virtual systems, and, in particular, to providing a virtual object in a virtual or semi-virtual environment, based on a characteristic associated with a user.

Example aspects herein include at least a method, system, and computer program, for providing the virtual object in the virtual or semi-virtual environment, based on the characteristic associated with the user. In one example embodiment herein, the system comprises at least one computer processor, and a memory storing instructions that, when executed by the at least one computer processor, perform a set of operations comprising determining a characteristic associated with a user in a virtual or semi-virtual environment with respect to a predetermined reference location in the environment, and providing a virtual object based on the characteristic.

In one example embodiment herein, the system further comprises a head mounted display (HMD), the at least one computer processor is operatively connected to the HMD, and the providing includes presenting the virtual object on a display of the HMD.

In another example aspect herein, the characteristic is a distance from the predetermined referenced location, and the providing includes providing the virtual object in a first predetermined form corresponding to the distance. The virtual object may be a virtual representation of an object at the predetermined reference location, and may include, for example, a virtual user interface that enables the user to operate the object at the predetermined location, regardless of the user's location or distance from that location. In one example embodiment, the user's location may be at a locomotion marker at which the user's view can be transported to a view associated with the locomotion maker.

In a further example aspect herein, the distance is a first distance, and the set of operations further comprises determining a second distance of the user from the predetermined reference position, the second distance being greater than the first distance, and providing the virtual object in a second predetermined form.

Providing the virtual object in the second predetermined form may include determining prioritized features included in the virtual object, and including the prioritized features in an emphasized manner in the virtual object in the second predetermined form.

According to an example aspect herein, the virtual or semi-virtual environment is one of a virtual reality environment, an augmented reality environment, and a mixed reality environment, and the user is one of a virtual user and a non-virtual user. The virtual object may be a virtual representation of an object at the predetermined reference location. As but one example, the object at the predetermined reference location may be a media or content player, and the virtual object may be a virtual user interface that enables the user to operate the media player, regardless of the user's location. The virtual object may be, for example, a floating virtual user interface, in one example.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

FIGS. 3A-3C depict example perspective views of a virtual object, a predetermined reference location, and fields of view and a line of sight of a user.

DETAILED DESCRIPTION

Figure 1:
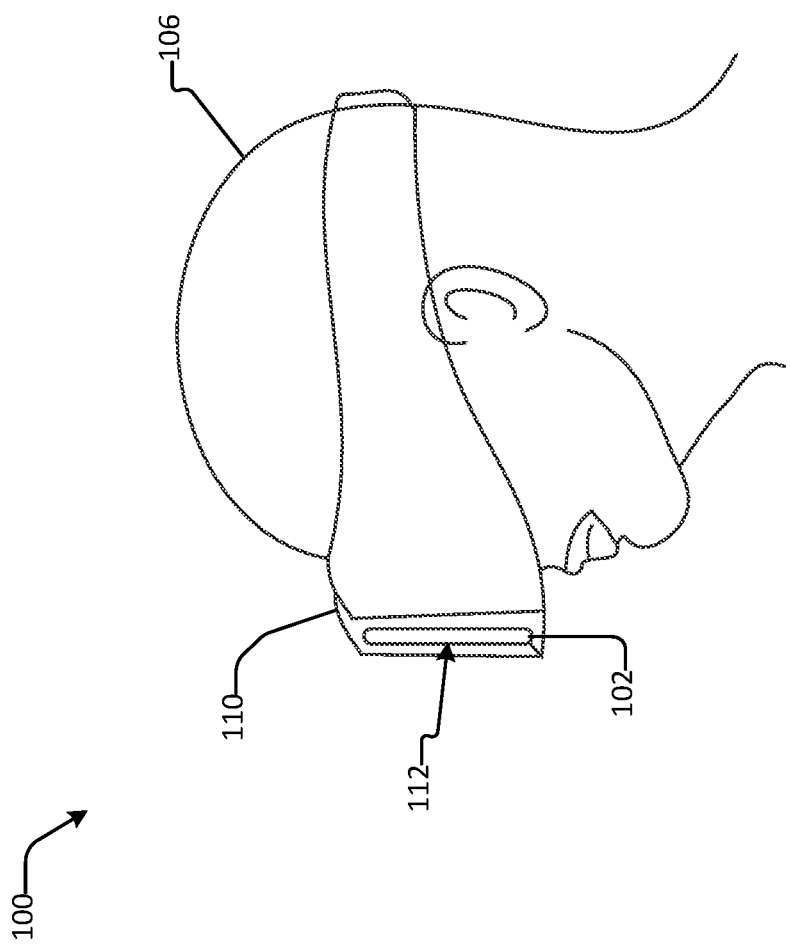
FIG. 1 illustrates an example of a head-mounted display.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

The present technology relates to providing an object, such as a virtual object, in a space, such as, for example, a 3D space, based on one or more characteristics associated with a user. The 3D space may include, for example, a virtual reality (VR) 3D space, or a semi-virtual space such as an augmented reality (AR) 3D space, a mixed reality (MR) 3D space, or the like. The virtual object, in one example, may be a 3D virtual object (although in other examples it can be a 2D virtual object).

In more detail, the present technology involves providing, such as generating, manipulating, or controlling, a virtual object, such as a virtual user interface, sign, billboard, character, text, symbol, shape, or any other virtual object, based on one or more characteristics associated with the user. For example, the one or more characteristics may include, without limitation, the user's position, orientation, location, direction (line) of sight or gaze, field of view, distance or angle, or the like, with respect to a predetermined reference location. The predetermined reference location can be the virtual object itself, or a non-virtual or semi-virtual object that is represented by the virtual object in the environment.

As non-limiting examples of the manner in which a virtual object is provided according to the present technology, the virtual object, or a component of a virtual object, such as a user interface component, may be provided to have a size, structure, and/or features that depend on a user's distance from a predetermined reference location. For example, the size may be increased as the user becomes more distant from the predetermined reference location so that the user can perceive and/or interact with the object, and maybe decreased in size (e.g., towards a predetermined standard size) as the user becomes closer to the reference location, while still enabling the user to perceive and/or interact with the object. In aspects, the size and number of interface components of the virtual object may dynamically change depending upon the size of the displayed virtual object. In this manner, the user still can perceive the object well despite his or her location, the object is maintained as recognizable and/or usable to the user, and/or the user is able to interact with the object, without necessarily having to relocate or transport to the particular reference location.

Of course, the above example is merely illustrative in nature and not limiting to the scope of the technology described herein. Indeed, in other examples, depending on applicable design criteria, the object can be decreased in size as the user becomes more distant from the predetermined reference location, and be made larger in size as the user becomes closer to the predetermined reference location, if doing so would be deemed useful to the user in a particular environment or application of interest.

In another example, providing the virtual object may include generating, manipulating, or controlling at least certain parts of the object based on one or more characteristics associated with the user. For example, some parts of the object (e.g., text, icons, user-selectable items, buttons, lines, segments, particular information or data, boxes, etc.), can be increased or decreased in size along one or more directions, made more or less pronounced or perceivable, moved, displaced, repositioned, blurred, animated, masked, faded, brightened, or otherwise modified, scaled, altered, highlighted, or adapted, relative to other parts of the object. As such, those parts of the object that may be deemed important to a user can still be perceived and/or interacted with by the user, despite the user's location or distance from the predetermined reference location. The providing of the object may be effected in a dynamic manner in real time as the characteristic(s) of the user vary, or at predetermined time intervals, predetermined space intervals, and/or at predetermined variations in the user characteristic(s). As an example involving predetermined variations in user characteristics, controlling or manipulating of the object can occur to a predetermined degree in response to a user, a user's body part, or line of sight, displaced by a predetermined linear or angular displacement with respect to a particular reference location. In other example embodiments herein, providing may be effected when the user is located at locomotion markers in the applicable environment, and may be performed in a manner that depends on the locations of those markers, and/or their respective distances from a predetermined reference location.

Before describing the manner in which virtual objects are provided in more detail, it is noted that example aspects herein may involve a user or operator wearing a head-mounted display (HMD) that provides, for example, a view for the user in a virtual or semi-virtual world or environment. While the user is viewing an environment through the HMD, the user may wish to interact with objects in the environment. To facilitate such interaction, the present technology may provide for displaying locomotion markers that may be selected by the user. For example, once the user selects the locomotion marker, the user's view can be transported to a view associated with the locomotion maker. As an example, a particular locomotion marker may be selected to view a particular object in the virtual or semi-virtual environment from a particular position and a particular orientation. One or more locomotion markers may also be associated with content. In some examples, when 3D content within the environment is created or modified, a locomotion marker may be associated with the 3D content that places a user in an optimal or preferred position and orientation to view the 3D object. In such examples, when the user's gaze focuses on or near the 3D object, a locomotion marker may be displayed that is properly oriented to view the object. The displayed locomotion marker may be selected to teleport the user to the optimal position and orientation in order to view the 3D object within the environment.

The locomotion marker may be selected through a hand-held control unit, though a smart phone, through other controls operatively connected to the HMD, or based on a particular gaze or view of the user. The locomotion marker may also be selected by any means known to those having skill in the art.

As will be appreciated by those having skill in the art, in a virtual or semi-virtual world, the user's view corresponds to the positioning and orientation of a virtual camera in the virtual or semi-virtual environment. Changes to the positioning and orientation of the virtual camera in the environment cause the view of the environment experienced by the user to change. When an HMD is utilized as the viewing device for the user to see the environment, the orientation of the virtual camera is generally tied to the orientation of the head of the user wearing the HMD.

The orientation of the user's view or gaze within the virtual world is based on the orientation virtual camera in the virtual world. The virtual camera is controlled by the positioning of the HMD in the real world. The orientation of the virtual camera may be made with reference to a global coordinate system of the virtual world. For example, the virtual world may utilize a 3D Cartesian coordinate system having a pre-defined origin. The virtual camera may be considered an object within the virtual world, and its orientation may be defined by its Euler angles with respect to the global coordinate system. Those having skill in the art will also appreciate that different techniques for controlling or representing rotation of a virtual object, such as the use of rotation matrices, quaternions, or other techniques, may be utilized with the technology utilized herein.

Reference is now made to FIG. 1, which depicts an example of a head-mounted display system ("HMD") 110 having a display source 102, which can be used in conjunction with the technology described herein. The HMD 110 may be worn by a user 106 to provide content to the user 106 through the display source 102, such as virtual reality content, mixed reality content, or augmented reality content. In the example of providing augmented reality content, the front surface of HMD 110 may incorporate one or more cameras to allow an augmented video stream to be presented to the user 106 through the display source 102, which may be referred to as video augmented reality. The HMD 110 may also include integrated computing components to provide content as a stand-alone system. The HMD 110 may also include wireless or wired connectivity features to receive content from other computing devices, such as mobile phones, tablets, laptops, desktops, and the like. The display source 102 may be affixed towards the front of the HMD 110 using any means known to those having skill in the art. In some examples, the HMD 110 includes multiple display sources 102. For instance, the HMD 110 may include a display source 102 for each eye. In other examples, the display source 102 may be a smartphone or other similar device. The display source 102 may also include, or be displaced proximate to, lenses that allow for the user to more clearly see the images displayed on the display source. Other example HMD's know to those of skill in the art may be suitable for use with the present technology. The HMD 110 also can have a capability for determining characteristics associated with a user, such as the user's position, location, or orientation with respect to a predetermined reference location or virtual object. Any suitable technique can be employed for making such determinations, including, as one example, triangulation, and/or techniques based on roll, pitch, and yaw angles of a camera of the HMD 110, or the like.

Figure 2:
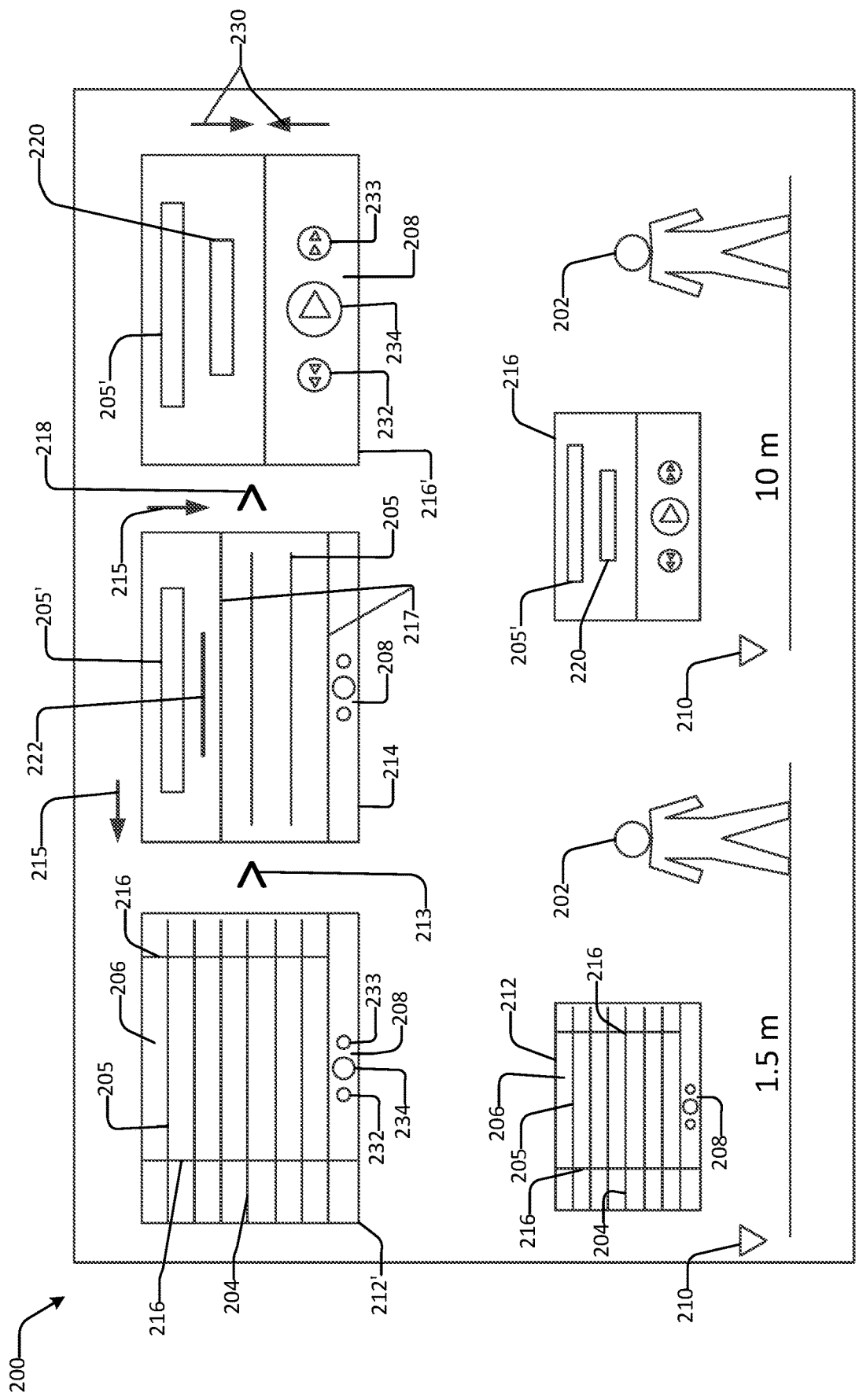
FIG. 2 illustrates an example virtual or semi-virtual environment, wherein a virtual object is provided based on a characteristic associated with a user, such as the user's location.

An example embodiment of the present application will now be described. FIG. 2 depicts an example virtual or semi-virtual environment 200, which can be, for example, a 3D space. A user 202 is shown in the environment. The user 202 may be, for example, a human, a virtual representation of a user such as an avatar, a semi-virtual representation of a human, or the like. Alternatively, the user 202 may be represented by a viewing or camera position. To help the user 202 navigate the environment 200, one or more virtual objects are provided.

Virtual object 212 is represented in FIG. 2. In one example, the object 212 can be a virtual representation of a reference location 210. By example only, the reference location 210 may be a media or content (e.g., music or video) player having a user interface, and object 212 is a virtual representation of the user interface. Other application user interfaces may be represented in virtual or augmented reality including, but not limited to, a web browser, a productivity user interface (e.g., document, spreadsheet, presentations), a file browser, etc. The virtual object 212 and the reference location 210 can be visible and/or presented on display source 102 of HMD 110. In one example aspect described herein, the object 212 may be a floating, or otherwise positioned, user interface that is user-operable. In one example in which the object 212 is a user interface, that interface is operable to enable the user to operate and interact with the media or content player and/or reference location 210. Also, in one example herein, the object 212 may be situated at the reference location 210, or be in association with it, or be at another location remote therefrom.

In the illustrated example, virtual object 212 enables the user 202 to select from a menu listing, for example, artists and music tracks, to play a particular music track, and to scroll through tracks and artists using the menu. The user 202 may operate the user interface by any known, suitable means, such as by using a pointer, eye movement, a hand selection, mouse, or the like. Of course, this example is by way of illustration only, and other types of user interfaces, and other types of virtual objects besides user interfaces, can be employed instead.

In the example of FIG. 2, when the user 202 is a particular distance away from reference location 210, such as 1.5 m away (e.g., such as at a locomotion marker), the object 212 is provided. The object 212 has particular predefined features arranged in a predefined structure, and a predetermined shape and size. The object 212 may include various types of features, such as, for example, text (e.g., artist and track names) 204, user-selectable items 208, information features 205, and/or other features, all structured as shown in the FIG. 2 example. While object 212 is described herein as a media player, one of skill in the art will appreciate that any type of virtual object may be employed with the aspects disclosed herein. The type of user interface elements or control displayed for object 212 can vary depending on a type of virtual object or content. As such, the specific user interface elements described herein should not be considered as limiting. In the illustrated example, items 208 include a "play" button 234, a "backward select" button 232, and a "forward select" button 233. Lines 216 and spaces 206 also are shown as being included in the object 212, 212'. In other examples, the items 208 also can include a volume control and/or an "on/off" control not shown). Object 212 is further represented in larger, duplicate form as object 212'.

As the user 202 displaces farther away from the reference location 210, such as at a distance somewhere between 1.5 m and 10 m (e.g., at a locomotion marker intermediate those distances), the object 212' changes (as represented by 213) to another form, and is provided as object 214. While specific physical or virtual distances are described herein, one of skill in the art will appreciate that these distances are provided for illustration purposes only and should not be construed as limiting. In other aspects, the dynamic changes described herein may be dependent upon different distances or other factors such as, for example, viewing angle. The object 212' may change form into object 214 (e.g., virtual user interface) either dynamically, by changing continuously as the user 202 displaces away from the reference location 210, or by changing only in response to the user 202 becoming displaced away from the reference location 210 by a predetermined linear (or non-linear) displacement, or in response to the user 202 reaching a particular location (e.g., locomotion marker) at the applicable distance. The elements displayed in object 213 may vary depending on the type of virtual object, a content type, and/or user preferences that may be statically defined or dynamically determined. As can be seen in FIG. 2, the size of the items 208 within object 214 is larger than those within object 212'. In addition, the portion of object 214 above the items 208 may be formed as a result of expanding the corresponding portion of object 212 (212') in the directions 215 shown in association with object 214, such that the features 205 of former object 212' are expanded into expanded features 205' and 222 of object 214, and such that at least some features 205 remain in object 214 but in larger form relative to those in object 212'. Also, features 216 (e.g., segmentation lines) of object 212' are not included in object 214, which instead includes features (e.g., segmentation lines) 217.

Also in the illustrated example, when the user 202 is displaced by a distance of, for example, 10 m away from the reference location 210, the virtual object 214 changes form (as represented by 218) into object 216 (e.g., a virtual user interface), which is further represented as object 216'. The object 214 can change form into object 216 (216') (e.g., virtual user interface) either dynamically, by changing continuously as the user 202 displaces away from the reference location 210, or by changing only in response to the user 202 becoming displaced away from the reference location 210 by a predetermined linear (or non-linear) displacement (e.g., 10 m), or in response to the user 202 reaching a particular locomotion marker at that distance. The object 216 (and object 216') results from an expansion of parts of object 214 in directions 230 shown in association with object 216'. The resulting object 216, 216' still includes feature 205', and also includes a feature 220 which is an expanded version of feature 222 of object 214. Features 205 from object 214 are not included in object 216, 216', and the user-selectable items 208 are shown scaled larger in size and in greater detail relative to those of object 214. In the illustrated example, the object 216 still remains at the location 210.

Of course, the objects 212, 212', 214, 216, and 216' may have other features, size, structures, and shapes than those depicted in FIG. 2, which is merely a representative example. Also, the object(s) may have additional intermediate forms depending on the user 202's distance from the location 210. Also, objects 214 and 216' are not necessarily included in the actual environment 200, and are represented in FIG. 2 merely for depicting how the manner in which objects are altered according to the present example embodiment.

By virtue of the manner in which the objects are provided in the example of FIG. 2, the farther the user 202 displaces from reference location 210, the larger at least some parts of the virtual object become to enable the user 202 to continue perceiving and/or interacting with the object in a suitable manner. In the example described above, those features include features 208 to enable the user to operate the user interface for selecting artists and/or music tracks. Regardless of the user 202's distance from the virtual object and/or predetermined reference location 210, the user 202 can still perceive and/or interact with those parts of the object that are deemed important to the user 202, such as track and artist information.

Figure 4A:
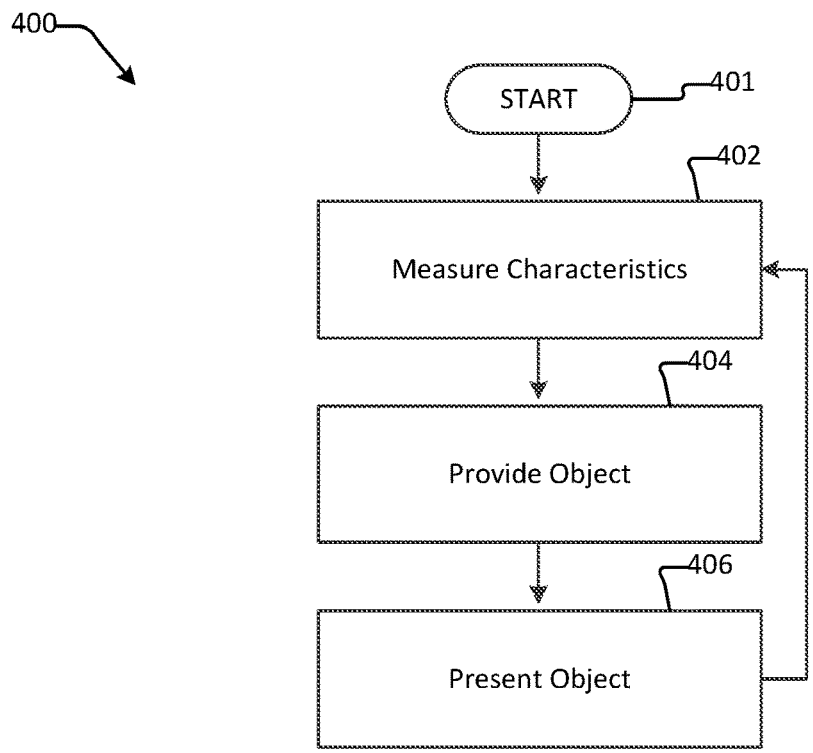
FIG. 4A depicts an example method for providing a virtual object based on a characteristic associated with a user.

FIG. 4A depicts an example method 400 for providing a virtual object depending on a characteristic associated with a user. The method commences at 401 and flow proceeds to operation 402 where one or more characteristics associated with the user are monitored. For example, the characteristics may include at least one of a position, location, distance, or orientation of a user, and/or a user's gaze, line of sight, and/or field of view, relative to a predetermined reference location. The particular characteristic(s) that are monitored at operation 402 may depend on applicable design criteria, and, in one example, the monitoring may be continuous, or performed only when the user is determined to be located at a particular location (e.g., locomotion marker). In embodiments where, for example, the user may be located at certain, known locations in the environment at a particular distance away from the predetermined reference location, such as in the case where locomotion markers are employed, then operation 402 may include recognizing that the user is that the particular distance away from the reference location (i.e., without necessarily performing measuring).

In one example embodiment herein, operation 402 measures or otherwise determines a value of the characteristic(s) being monitored. For convenience, the method is described herein in the context of the FIG. 2 example, and therefore operation 302 in this example includes monitoring or determining a distance of a user (e.g., user 202) from a predetermined reference location, such as location 210. In one example, performance of operation 302 may result in a determination that the user is a certain distance (e.g., 1.5 m or 10 m) away from the reference location 210.

In the case of the FIG. 2 example where the user 202 is determined in operation 402 to be a certain distance (1.5 m in the provided example) away from the reference location 210, then the virtual object 212 is provided in operation 404 for being presented in the environment (operation 406). In a case where operation 402 determines that the user 202 is at some location (e.g., a locomotion marker), or within a particular range of points, somewhere between 1.5 m and 10 m, in the provided example, away from the reference location 210, then the virtual object 214 is provided in operation 404 for presentation in the environment (operation 406). On the other hand, in a case where operation 402 determines that the user 202 is 10 m away from the reference location 210, then the virtual object 216 is provided in operation 404 for presentation in the environment (operation 406). In either case, after operation 406 is performed, control passes back to operation 402 which is performed in the above-described manner. In one aspect, presenting the virtual object in the example may comprise rendering a new virtual object. Alternatively, presenting the virtual object may comprise modifying a previously presented virtual object to include new elements. Animations may be provided during the modification that result in a smooth transformation of a virtual object from a first form to a second form.

Of course, although described above in the context of providing a virtual object based on a distance between the user 202 and the predetermined reference location, in other example embodiments herein the providing can be based on one or more additional characteristics besides distance, or the providing can be based on one or more other characteristics in lieu of distance. At least one such characteristic may include, without limitation, the user's orientation. Also, in other embodiments, operation 402 can include detecting any variation in the one or more characteristics relative to the reference location, or, in another example, detecting a predetermined variation in the one or more characteristics relative to the reference location. For example, in the case of the FIG. 2 example, operation 402 may include detecting that a distance or orientation of user 202 relative to the predetermined reference location has varied as a result of movement of the user 202, and also detecting whether the variation indicates that the distance or orientation has increased or decreased in some respect, by any value, and/or at least by a predetermined value. In either case, the object is provided in operation 404 based on a result of the detecting, preferably such that the object can still be perceived and/or interacted with by the user.

According to an example aspect herein, the manner in which the virtual object is provided may take into account which features are deemed most important, interesting, or useful to a user, and also can vary depending on, for example, the user's location, orientation, position, or distance relative to the predetermined reference location. By example, the virtual object can be presented in a manner to include such features, while reducing or minimizing emphasis on features of the object that are deemed less important, interesting, or useful to the user. Which features are deemed important, interesting, and useful can be set according to pre-programming or can be based on a predetermined priority order, or can be based on user-specified preferences. In one example aspect described herein, the priority order is determined based on a history of user interactions with the object. For example, a record can be stored of the types and numbers of interactions the user has had with the object. In the example of the media interface discussed above in connection with FIG. 2, it may occur that the user selects the items 208 most among any other selectable features of the interface and information can be stored to indicate that those features 208 are therefore prioritized in that they are deemed important, interesting, or useful to the user.

Figure 4B:
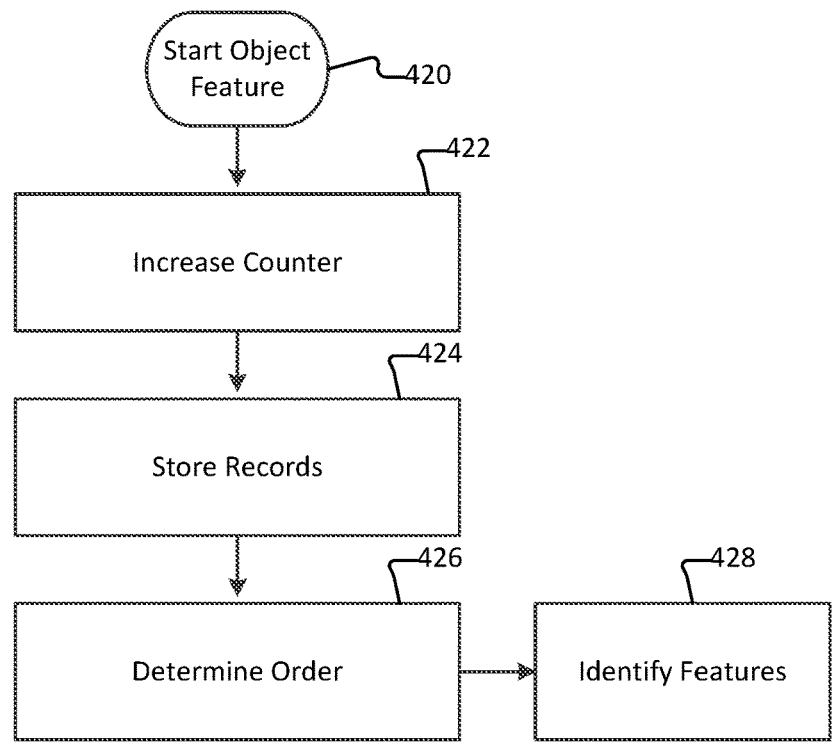
FIG. 4B depicts an example method for determining a priority of virtual object features.

A method for determining a priority of features according to an example aspect herein will now be described. The method may be performed as part of the operations 404 and/or 406. Referring to FIG. 4B in conjunction with FIG. 2, in response to a user selecting a feature (e.g., "play" button 234) of the virtual object (operation 420), such as virtual object 212 of FIG. 2, a counter corresponding to that feature is increased by a value of '1' in operation 422, and a record of the selection of the feature and of the counter is stored in operation 424. Then, based on stored records for all of the object features (e.g., records stored in response to all prior selections made in operation 420 of any features, or only those selections made over a predetermined time period), in operation 426 an order may be determined indicating the features most selected by the user, to features least selected by the user. Then, in operation 428 a predetermined number of those features, such as, e.g., the top three (or another predetermined number) are identified for being presented in the virtual object regardless of where the user is located in the environment. For the example of FIG. 2, it may occur that performance of operations 420-428 results in items 208 (among other possible features) being identified in operation 428. As such, those items 208 are deemed important, interesting, or useful to the user, and thus will be included in the virtual object provided (in operations 404 and 406, respectively, of FIG. 4A) in the environment, regardless of the distance of the user from the predetermined reference location 210.

Another example aspect of the present technology will now be described. In this example aspect, a virtual object can be presented in a manner that depends on a characteristic associated with a user, such as a field of view of the user. The field of view can be predefined as having one or more specific ranges. In an illustrative example, the field of view is predefined as including at least one of a predetermined "far field of view" and/or a predetermined "near field of view", as represented in FIGS. 3A-3C, which show a user 302 gazing in respective different directions. FIGS. 3A-3C also show near field of view 308, far field of view 306, and a line of sight 310, of user 302. Of course, this representation is not intended to be limiting to the scope of the technology described herein, and one or more other predetermined ranges or fields of view can be employed instead. Moreover, the terms "far peripheral field of view" and "near peripheral field of view" are not necessarily intended to be interpreted as those terms may be known in the art.

In an example herein, virtual object 304 can be presented in a manner depending on whether or not it (or a predetermined reference location 312, in another example embodiment), appears within the user's field of view, and depending on which field of view it appears in. For example, in a case where it is determined that the virtual object 304 intersects with or is within the far peripheral field of view 306, but does not intersect with any part of the near peripheral field of view 308, as represented in FIG. 3A, then the virtual object 304 can be provided in a predetermined form that is intended to gain the user's attention. As an example, the virtual object may blink, be presented in a predetermined bright color and/or in association with a halo 310, be presented as animated or moving (e.g., jumping), be presented as a virtual robot or other character, or be highlighted in some predetermined manner that attracts the user's attention, depending on applicable design criteria.

On the other hand, and referring to FIG. 3B, if the virtual object 304 is determined to intersect with or be within the user's near peripheral field of view 308, then the virtual object 304 can be provided either in the same form as that employed for the far peripheral field of view, or in another form, such as with or without highlighting, depending on applicable design criteria. For example, the virtual object 304 can be highlighted in a predetermined form that differs from that of the object when in the far field of view 306. In one example embodiment wherein the object 304 is moved to attract the user's attention while in the far peripheral field of view 306, the object 304 can be presented as being stationary while in the near peripheral field of view 308.

In a case where virtual object 304 is determined to not intersect with any field of view of the user 302, as represented in FIG. 3C, then the object 304 can be provided in still another form (e.g., a non-highlighted or faded form), or it can be omitted entirely from the environment, depending on applicable design criteria. In yet another example embodiment herein, in a case where the virtual object 304 is determined to be in a direct line of sight 310 of the user 302, as represented in FIG. 3B, then the virtual object 304 also can be provided either in the same form as that for either of the above field of views 304, 306, or in another form, such as with or without highlighting, depending on applicable design criteria.

An example flow diagram of a method for generating and presenting a virtual object based on a view of the user will now be described, with reference to FIG. 5, in conjunction with FIGS. 3A-3C. At 502 the method commences and proceeds to operation 504, where monitoring is performed to determine whether a virtual object, such as object 304, intersects any part of a user's near peripheral field of view, such as view 308. If this operation results in a determination of "yes", then control passes to operation 506 where it is determined whether the virtual object 304 intersects with the user's line of sight 310. If the object 304 does intersect with the line of sight 310 ("yes" in operation 506), then in operation 508 the virtual object 304 is presented in a first predetermined form (e.g., in highlighted form, moving in a particular manner, or not). Flow then passes back to operation 504 where continued monitoring is performed.

If "no" in operation 506, which would be the case where the virtual object 304 is within the near peripheral field of view 308 of the user 302 but not in the user's direct line of sight 310, then control passes to operation 510, where the virtual object 304 is provided in a second predetermined form. Flow then passes back to operation 504 where continued monitoring is performed.

Referring again to operation 504, in a case where that operation determines that the virtual object 304 does not intersect with the near peripheral field of view 308, it is then determined in operation 512 whether the virtual object 304 intersects with the user's far peripheral field of view 306. If "yes" in operation 512, then in operation 514 the virtual object is presented in a third predetermined form. As an example of the third predetermined form, as described above, the object 304 can be presented in manner so as to attract the user's attention (e.g., the object can blink, be presented in a predetermined bright color and/or with a halo 310, be presented as animated or moving (e.g., jumping), be presented as a virtual robot or other character, or be highlighted in some predetermined manner). Flow then passes back to operation 504 where continued monitoring is performed.

If operation 512 results in a determination of "No", which would be the case where the virtual object 304 does not intersect with any of the views 306, 308 of the user 302, then operation 516 is performed, wherein, for example, the object 304 is presented in passive form. For example, the object 304 can be presented in a non-highlighted form, a faded form, or can be omitted entirely from the environment (or in any other predetermined form). As such, the passive form is one that is not necessarily for attracting the user's attention.

As described above, in another example embodiment, virtual object 304 can be presented in a manner depending on whether or not predetermined reference location 312, appears within the user's field of view, and depending on which field of view it appears in. In that embodiment, the functionality described above is the same except that the operations for determining whether the virtual object 304 are included within or intersects with the fields of view 306, 308 and line of sight 310, instead are performed for determining whether the predetermined reference location 312 is included within or intersects with the fields of view 306, 308 and line of sight 310, and then the virtual object 304 (and/or predetermined reference location) is provided in a similar manner as described above, based on the result. FIGS. 3a-3c represent the same situations as described above for virtual object 304, for the predetermined reference location 312. For example, in FIG. 3A the location 312 intersects with field of view 306, in FIG. 3B the location 312 is within the field of view 308 and line of sight 310, and in FIG. 3C the location 312 is not in within any field of view or line of sight. For each scenario the virtual object 304 (and/or predetermined reference location 312) can be provided in the manner described above (see operations 508, 510, 514, 516), depending on the scenario.

According to one example embodiment herein, determinations of whether the virtual object, and/or predetermined reference location, is/are within a field of view or line of sight of the user, and characteristics associated with the user, such as, e.g., a user's distance from the location, may be based on identifying at least one of a pitch angle, yaw angle, or roll angle value for the virtual camera controlled by the position of the HMD. If directional vectors corresponding to the at least one the pitch, yaw, or roll value would pass through the object/location, the object/location may be determined to be in a particular corresponding field of view or line of sight of the user. In some examples, the size and/or range of the field of views may vary based upon the size of the virtual world, and/or the size or type of the virtual object/location, among other possible options.

In view of the example aspects described herein, a responsive virtual object such as a user interface may be provided having dimensions, representation, and functionality dictated by a viewer's distance from the object. The object may be adjust in fidelity according to an optimal set of commands based on, for example, a user's distance from a predetermined reference location. From the user's perspective, in one example, the closer the user becomes to the location, the more information is presented in the object, versus the same information at a higher resolution. Also, the user's gaze can be used as a trigger, such as, for example, to cause the user interface to become operable or to take a predetermined form based on a characteristic such as the user's distance (and/or to transport the user to a locomotion marker). The example aspects described herein enable operators who do not have necessary expertise to design correct 3D object views and/or interfaces and to operate them or otherwise interact with them, regardless of their level of expertise.

Figure 5:
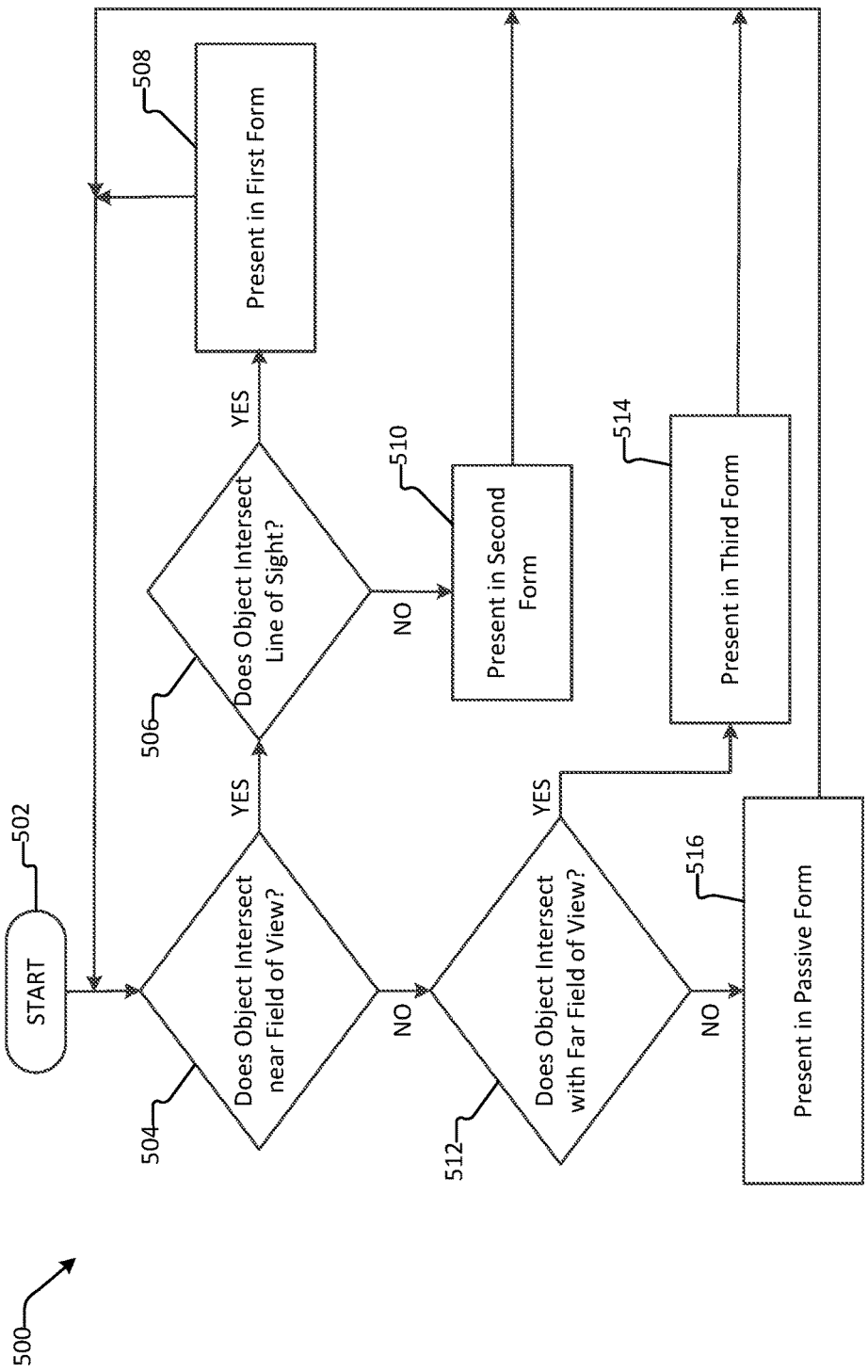
FIG. 5 depicts an example method for providing a virtual object based on a characteristic associated with a user, such as field of view of the user.

Although the above description describes the methods of FIGS. 4A and 4B separately from the method of FIG. 5, in some embodiments the methods can be performed together such that the virtual object may be provided based on the presence of multiple characteristics such as the location, field of view, and line of sight of the user. For example, as described above the user's gaze can act as a trigger. In one example embodiment herein, virtual object 304 can be the same as the virtual object of FIG. 2, and the predetermined reference locations 210 and 310 also may be the same. In one example embodiment herein, the method 400 (FIG. 4A) can start 401 in response to the virtual object or predetermined reference location intersecting or becoming within the user's near peripheral field of view 308 or line of sight 310, as represented in FIG. 3B, although in other examples the method 400 can start 401 in response to the virtual object or predetermined reference location intersecting with or coming within the far peripheral field of view 306, as represented in FIG. 3A. In one example, the object 304 can be a virtual representation of a reference location 312, the reference location 312 may be, for example, a media or content player or other content provider, and the object 304 can be a virtual user interface that enables the user to operate the media or content provider. Each can be visible and/or presented on display source 102 of HMD 110. Also, in some examples, the selection of a locomotion marker can trigger the start 401 of method 400.

Also, although described in the context of providing a single virtual object, the various aspects described herein is not so limited. Indeed, in other example aspects, more than one virtual object, and different types of virtual objects (e.g., not only user interfaces) may be provided based on one or more characteristics associated with a user, using technology described herein. Moreover, in addition to providing a virtual object based on one or more characteristics associated with the user, in some example aspects other elements may be provided as well, in addition to, or in lieu of, a virtual object. For example, lighting and/or sounds (e.g., music) in the virtual or non-virtual environment may be controlled based on the characteristic(s) associated with the user. As an example, in a case where the user becomes more distant from the predetermined reference location, and/or depending on whether the predetermined reference location or virtual object is within the user's field of view, lighting in the environment can be controlled so as to be made more or less intense, depending on the location and applicable design criteria or user preferences. The volume of music also can be increased or decreased depending on the same factor(s).

FIGS. 6-9 and the associated descriptions provide a discussion of a variety of operating environments in which aspects of the disclosure may be practiced. However, the devices and systems illustrated and discussed with respect to FIGS. 6-9 are for purposes of example and illustration and are not limiting of a vast number of computing device configurations that may be utilized for practicing aspects of the disclosure, described herein.

Figure 6:
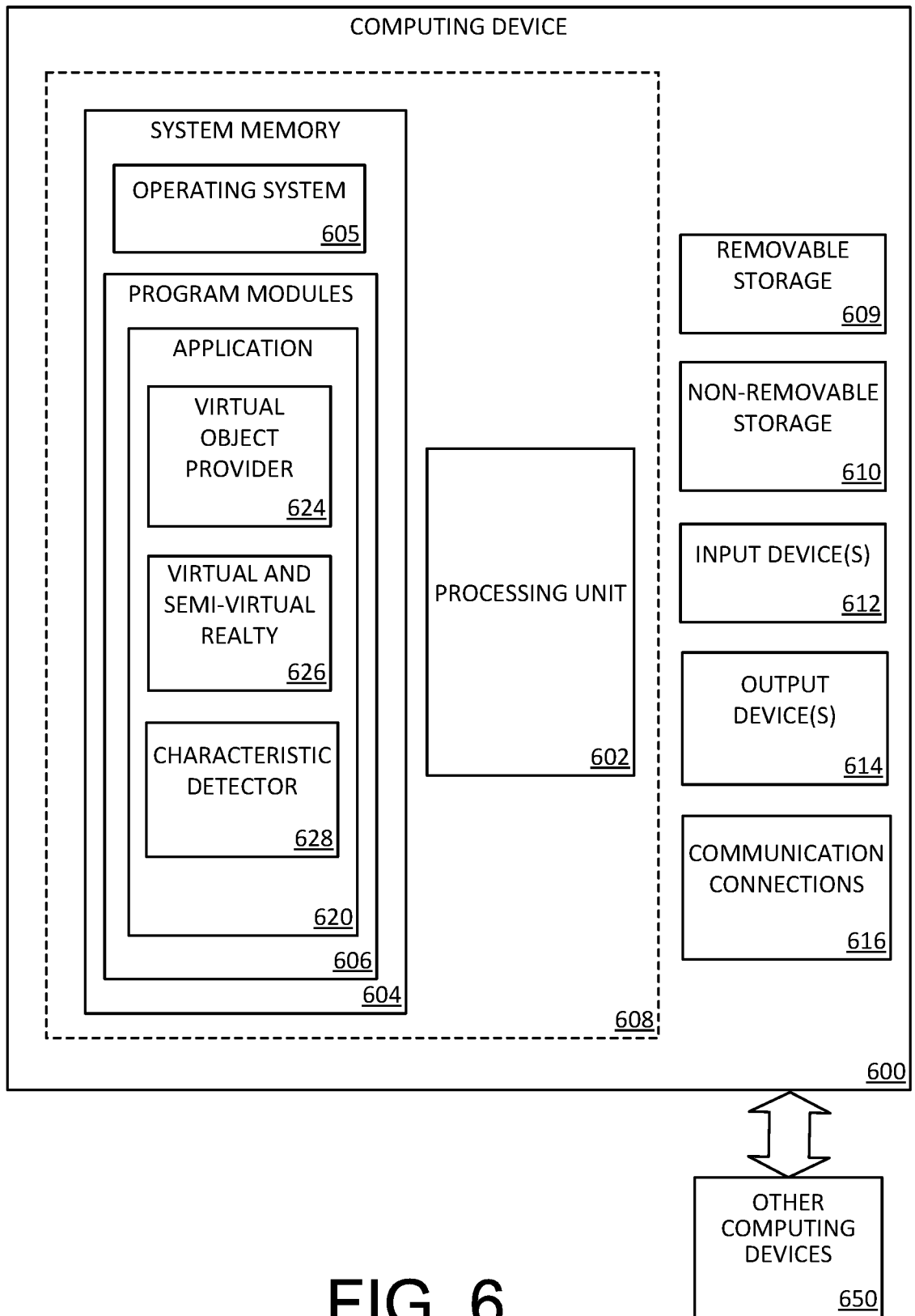
FIG. 6 is a block diagram illustrating example physical components of a computing device with which aspects of the disclosure may be practiced.

FIG. 6 is a block diagram illustrating physical components (e.g., hardware) of a computing device 600 with which aspects of the disclosure may be practiced. The computing device components described below may be suitable for the computing devices described above, such as smart phones, tablets, HMDs, laptops, desktops, or other computing devices. In a basic configuration, the computing device 600 may include at least one processing unit 602 and a system memory 604. Depending on the configuration and type of computing device, the system memory 604 may comprise, but is not limited to, volatile storage (e.g., random access memory), non-volatile storage (e.g., read-only memory), flash memory, or any combination of such memories.

The system memory 604 may include an operating system 605 and one or more program modules 606 suitable for running software application 620, such as one or more components supported by the systems described herein. As examples, system memory 604 may store a virtual world and associated functions and operations to be completed within the virtual world. The operating system 605, for example, may be suitable for controlling the operation of the computing device 600.

Furthermore, embodiments of the disclosure may be practiced in conjunction with a graphics library, other operating systems, or any other application program and is not limited to any particular application or system. This basic configuration is illustrated in FIG. 6 by those components within a dashed line 608. The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by a removable storage device 609 and a non-removable storage device 610.

As stated above, a number of program modules and data files may be stored in the system memory 604. While executing on the processing unit 602, the program modules 606 (e.g., application 620) may perform processes including, but not limited to, the aspects, as described herein. Other program modules that may be used in accordance with aspects of the present disclosure may include a virtual object providing application 624, 3D processing and virtual reality and/or semi-virtual reality applications 626, a characteristic detector 628, electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 600 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 600 may also have one or more input device(s) 612 such as a keyboard, a mouse, a pen, a sound or voice input device, a touch or swipe input device, handheld gaming controller, etc. The output device(s) 614 such as a display, speakers, a printer, etc. may also be included. The aforementioned devices are examples and others may be used. The computing device 600 may include one or more communication connections 616 allowing communications with other computing devices 650. Examples of suitable communication connections 616 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 604, the removable storage device 609, and the non-removable storage device 610 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media is not a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 7A:
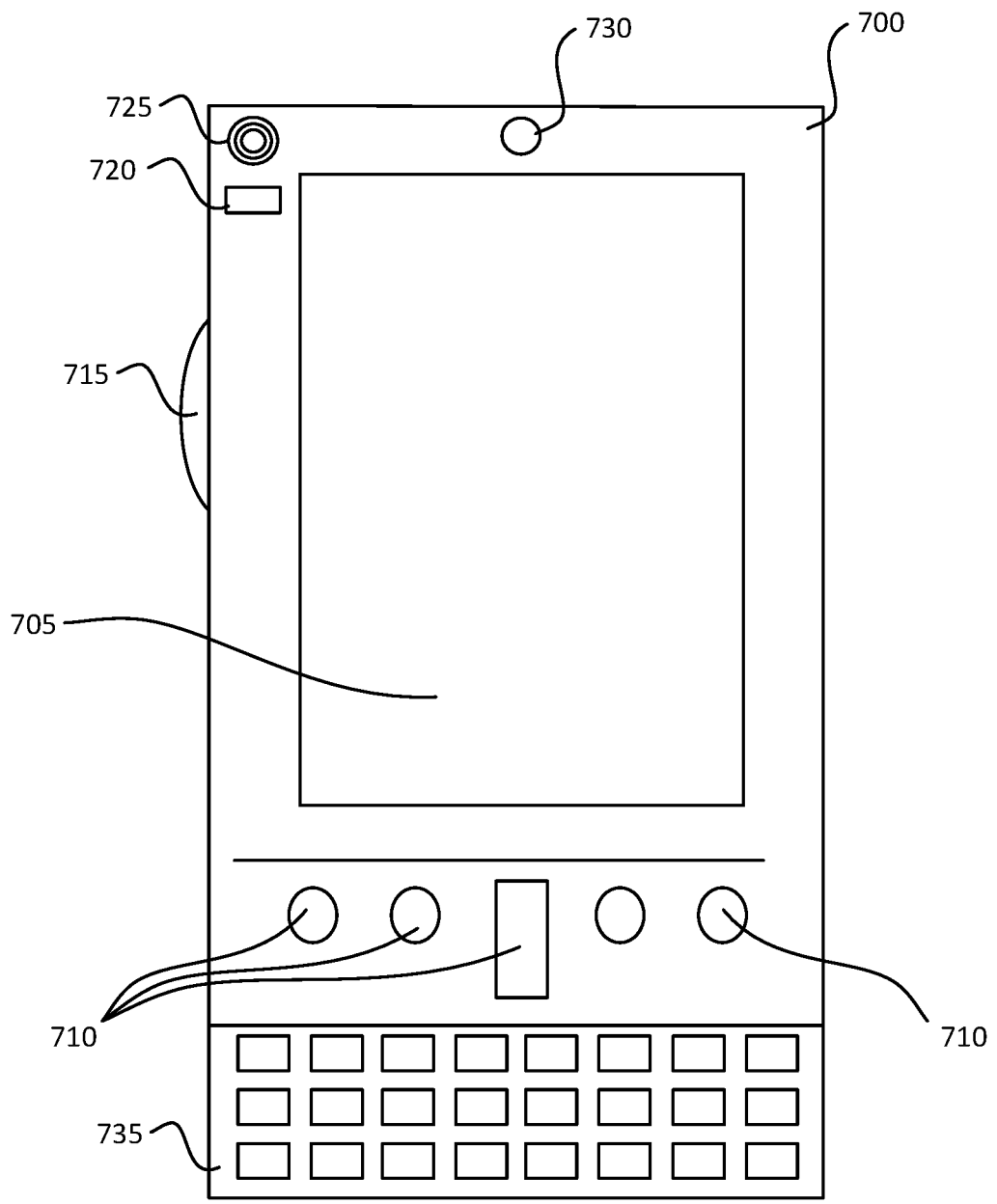
FIGS. 7A and 7B are simplified block diagrams of a mobile computing device with which aspects of the present disclosure may be practiced.
Figure 7B:
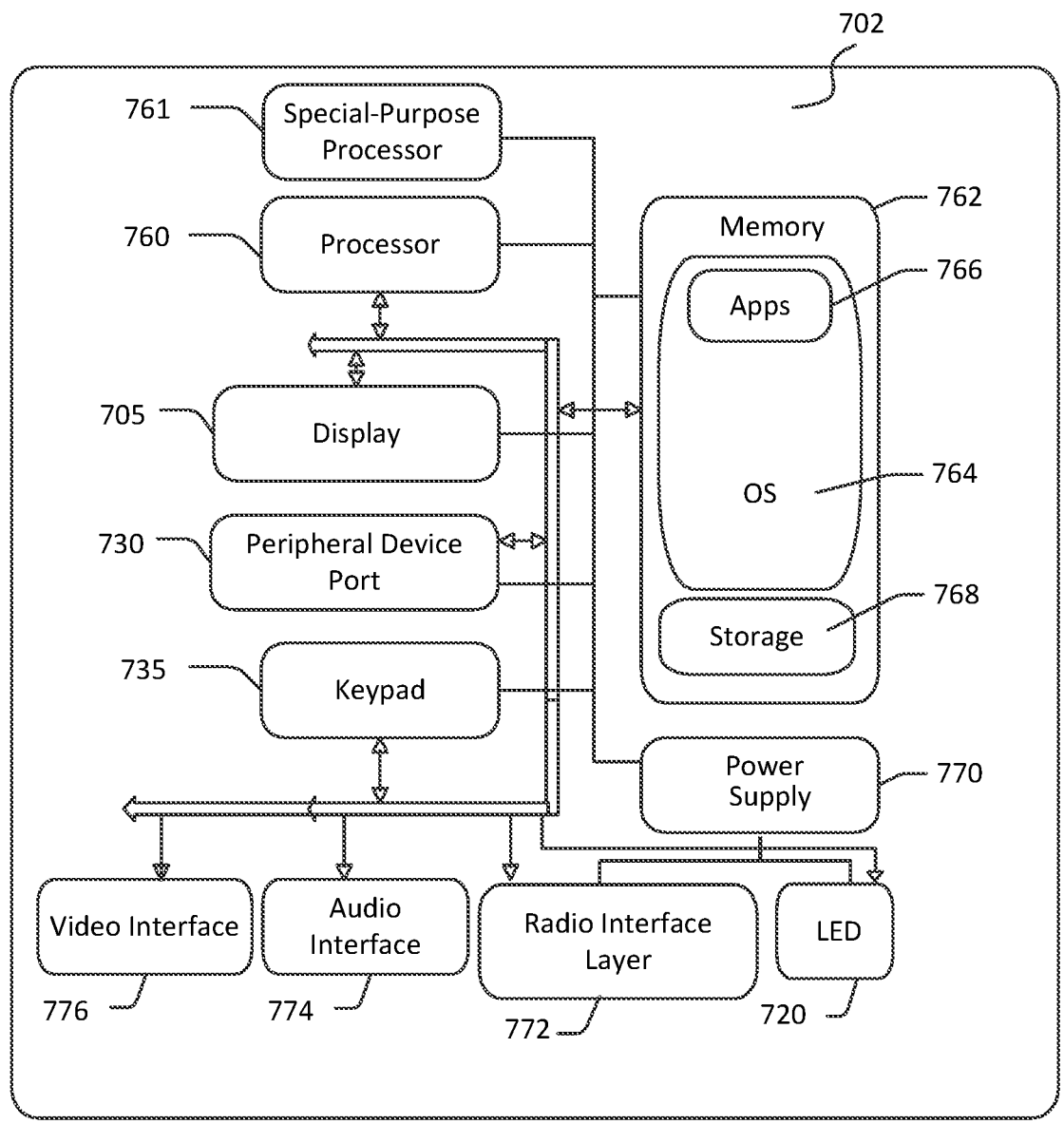

FIGS. 7A and 7B illustrate a mobile computing device 700, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 7A, one aspect of a mobile computing device 700 for implementing the aspects is illustrated. In a basic configuration, the mobile computing device 700 is a handheld computer having both input elements and output elements. The mobile computing device 700 typically includes a display 705 and one or more input buttons 710 that allow the user to enter information into the mobile computing device 700. The display 705 of the mobile computing device 700 may also function as an input device (e.g., a touch screen display).

If included, an optional side input element 715 allows further user input. The side input element 715 may be a rotary switch, a button, or any other type of manual input element. In alternative aspects, mobile computing device 700 may incorporate more or less input elements. For example, the display 705 may not be a touch screen in some embodiments.

In yet another alternative embodiment, the mobile computing device 700 is a portable phone system, such as a cellular phone. The mobile computing device 700 may also include an optional keypad 735. Optional keypad 735 may be a physical keypad or a "soft" keypad generated on the touch screen display.

In various embodiments, the output elements include the display 705 for showing a graphical user interface (GUI), a visual indicator 720 (e.g., a light emitting diode), and/or an audio transducer 725 (e.g., a speaker). In some aspects, the mobile computing device 700 incorporates a vibration transducer for providing the user with tactile feedback. In yet another aspect, the mobile computing device 700 incorporates input and/or output ports, such as an audio input (e.g., a microphone jack), an audio output (e.g., a headphone jack), and a video output (e.g., a HDMI port) for sending signals to or receiving signals from an external device.

FIG. 7B is a block diagram illustrating the architecture of one aspect of a mobile computing device. That is, the mobile computing device 700 can incorporate a system (e.g., an architecture) 702 to implement some aspects. In one embodiment, the system 702 is implemented as a "smart phone" capable of running one or more applications (e.g., browser, e-mail, calendaring, contact managers, messaging clients, games, and media clients/players). In some aspects, the system 702 is integrated as a computing device, such as an integrated personal digital assistant (PDA) and wireless phone.

One or more application programs 766 may be loaded into the memory 762 and run on or in association with the operating system 764. Examples of the application programs include phone dialer programs, e-mail programs, personal information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700 described herein (e.g., search engine, extractor module, relevancy ranking module, answer scoring module, etc.).

The system 702 has a power supply 770, which may be implemented as one or more batteries. The power supply 770 might further include an external power source, such as an AC adapter or a powered docking cradle that supplements or recharges the batteries.

The system 702 may also include a radio interface layer 772 that performs the function of transmitting and receiving radio frequency communications. The radio interface layer 772 facilitates wireless connectivity between the system 702 and the "outside world," via a communications carrier or service provider. Transmissions to and from the radio interface layer 772 are conducted under control of the operating system 764. In other words, communications received by the radio interface layer 772 may be disseminated to the application programs 766 via the operating system 764, and vice versa.

The visual indicator 720 may be used to provide visual notifications, and/or an audio interface 774 may be used for producing audible notifications via the audio transducer 725. In the illustrated embodiment, the visual indicator 720 is a light emitting diode (LED) and the audio transducer 725 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 725, the audio interface 774 may also be coupled to a microphone to receive audible input, such as to facilitate a telephone conversation. In accordance with embodiments of the present disclosure, the microphone may also serve as an audio sensor to facilitate control of notifications, as will be described below. The system 702 may further include a video interface 776 that enables an operation of an on-board camera 730 to record still images, video stream, and the like.

A mobile computing device 700 implementing the system 702 may have additional features or functionality. For example, the mobile computing device 700 may also include additional data storage devices (removable and/or non-removable) such as, magnetic disks, optical disks, or tape.

Such additional storage is illustrated in FIG. 7B by the non-volatile storage area 768.

Data/information generated or captured by the mobile computing device 700 and stored via the system 702 may be stored locally on the mobile computing device 700, as described above, or the data may be stored on any number of storage media that may be accessed by the device via the radio interface layer 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio interface layer 772 or via a distributed computing network. Similarly, such data/information may be readily transferred between computing devices for storage and use according to well-known data/information transfer and storage means, including electronic mail and collaborative data/information sharing systems.

Figure 8:
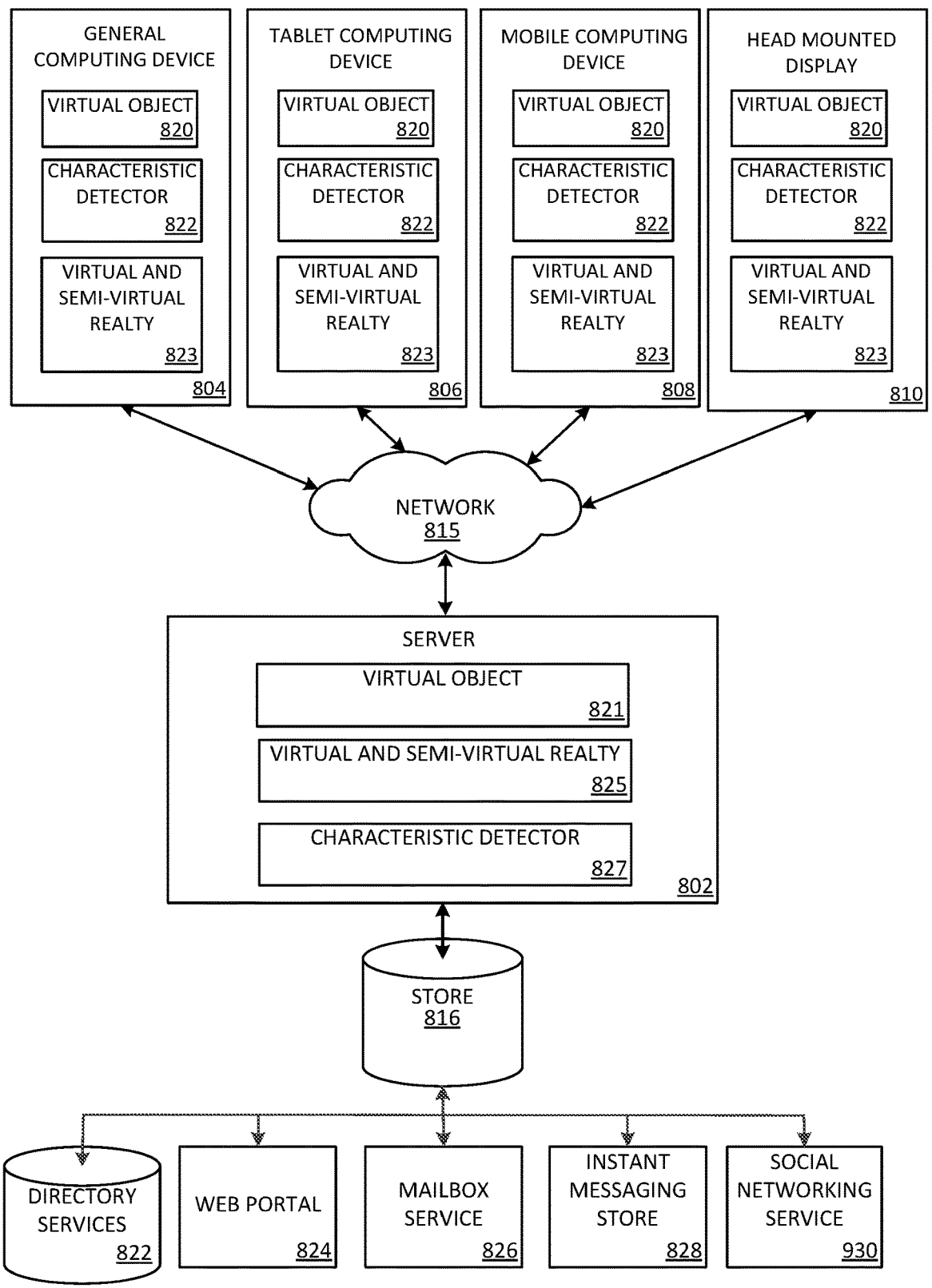
FIG. 8 is a simplified block diagram of a distributed computing system in which aspects of the present disclosure may be practiced.

FIG. 8 illustrates one aspect of the architecture of a system for processing data received at a computing system from a remote source, such as a personal computer 804, tablet computing device 806, or mobile computing device 808, as described above. Content displayed at server device 802 may be stored in different communication channels or other storage types. For example, various documents may be stored using a directory service 822, a web portal 824, a mailbox service 826, a virtual reality store 828, or a social networking site 830.

A virtual object provider program 820, characteristic detector program 822 and virtual/semi-virtual reality program 823 may be employed by a client that communicates with server device 802, and/or the virtual object provider program 821, virtual/semi-virtual reality program 825, and characteristic detector program 827 may be employed by server device 802. The server device 802 may provide data to and from a client computing device such as a personal computer 804, a tablet computing device 806 and/or a mobile computing device 808 (e.g., a smart phone) through a network 815. By way of example, the computer system described above may be embodied in a personal computer 804, a tablet computing device 806, a mobile computing device 808 (e.g., a smart phone), and/or an HMD 810. Any of these embodiments of the computing devices may obtain content from the store 816, in addition to receiving graphical data useable to be either pre-processed at a graphic-originating system, or post-processed at a receiving computing system.

Figure 9:
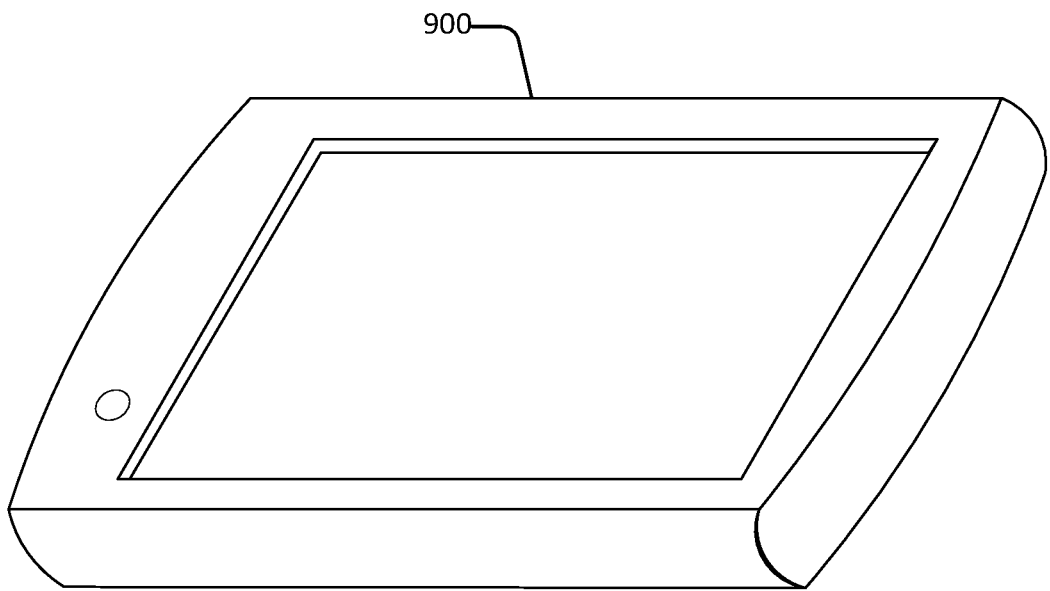
FIG. 9 illustrates a tablet computing device for executing one or more aspects of the present disclosure.

FIG. 9 illustrates an exemplary tablet computing device 900 that may execute one or more aspects disclosed herein in connection with a virtual reality device. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As will be understood from the foregoing disclosure, one aspect of the technology relates to a method for providing a virtual object in a virtual or semi-virtual 3D environment. The method comprises: determining a characteristic associated with a user in the 3D environment with respect to a predetermined reference location in the environment; providing a first representation of a virtual object based on the characteristic; determining a new characteristic associated with the user in the 3D environment with respect a second predetermined reference location in the environment; and based upon the new characteristic, providing a second representation of the virtual object. In an example, the new characteristic is a distance of the user from the predetermined reference location. In another example, the providing the first representation comprises providing the virtual object in a first predetermined form corresponding to the distance. In a further example, the distance is a first distance, and the method further comprises: determining a second distance of the user from the predetermined reference position, the second distance being greater than the first distance, wherein the second representation is provided in a second predetermined form based upon the second distance. In yet another example, at least some features of the virtual object in the second predetermined form are larger in size than corresponding features of the virtual object in the first predetermined form. In a further still example, the second predetermined form enables the user to do at least one of perceive or interact with the virtual object in the second predetermined form, regardless of the second distance. In another example, providing the virtual object in the second predetermined form comprises: determining prioritized features included in the virtual object; and including the prioritized features in an emphasized manner in the virtual object in the second predetermined form. In a further example, the new characteristic is a field of view of the user. In yet another example, the new characteristic is at least one of a field of view of the user and a line of sight of the user, and the method further comprises determining whether at least one of the virtual object or the predetermined reference location intersects with the field of view or the line of sight. In a further still example, the method further comprises: detecting whether at least one of the virtual object or predetermined reference location intersects a field of view or line of sight of the user, wherein the new characteristic is a distance of the user from the predetermined reference location, and wherein providing the first representation comprises providing the virtual object in a first predetermined form corresponding to the distance. In another example, the first predetermined form is one that attracts the user's attention.

In another aspect, the technology relates to a system comprising: at least one computer processor; and a memory storing instructions that, when executed by the at least one computer processor, perform a set of operations comprising: determining a characteristic associated with a user in the 3D environment with respect to a predetermined reference location in the environment; providing a first representation of a virtual object based on the characteristic; determining a new characteristic associated with the user in the 3D environment with respect a second predetermined reference location in the environment; and based upon the new characteristic, providing a second representation of the virtual object. In an example, the system further comprises a head mounted display (HMD), wherein the at least one computer processor is operatively connected to the HMD. In another example, the providing the first representation comprises presenting the virtual object on a display of the HMD. In a further example, the characteristic is a distance from the predetermined referenced location, and wherein providing the first representation comprises providing the virtual object in a first predetermined form corresponding to the distance. In yet another example, the distance is a first distance, and the set of operations further comprises: determining a second distance of the user from the predetermined reference position, the second distance being greater than the first distance, wherein the second representation is provided in a second predetermined form based upon the second distance. In a further still example, providing the virtual object in the second predetermined form comprises: determining prioritized features associated with the virtual object; and displaying the prioritized features in an emphasized manner in the virtual object in the second predetermined form. In another example, the virtual or semi-virtual environment is one of a virtual reality environment, an augmented reality environment, and a mixed reality environment. In a further example, the user is one of a virtual user and a non-virtual user.

In a further aspect, the technology relates to a computer storage medium encoding computer executable instructions that, when executed by at least one processor, performs a method comprising: determining a first distance between a user in the 3D environment with respect to a predetermined reference location in the environment; providing a first representation of a virtual object based on the first distance, wherein the first representation comprises a first set of user interface components, wherein at least one component of set of user interface components is sized based at least upon the first distance; determining a second distance between the user in the 3D environment; and providing a second representation of the virtual object based on the second distance, wherein the second representation comprises a second set of user interface components, the second set comprising at least one new component that is not included in the first set.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed technology. The claimed technology should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The invention claimed is:

1. A method for controlling a virtual user interface in a virtual or semi-virtual 3D environment, wherein the virtual user interface is interactive to enable remote control of an electronic device positioned at a predetermined reference location, the method comprising:
   determining a characteristic, wherein the characteristic is based on at least one of a field of view of the user or a line of sight of the user, wherein the field of view corresponds to one or more predefined peripheral ranges from the line of sight, and wherein the line of sight corresponds to a direction of a gaze of the user;
   providing the virtual user interface based on the characteristic, wherein the virtual user interface is of a size comprising a set of controls including a first number of controls;
   determining a change to at least one of: the field of view of the user or the line of sight of the user; and
   in response to the change, reconfiguring the virtual user interface at least by maintaining the size and changing the set of controls, wherein the set of controls of the reconfigured virtual user interface includes a second number of controls having at least one more control or at least one less control than the first number of controls provided in the virtual user interface.

2. The method of claim 1, wherein providing the virtual user interface based on the field of view of the user comprises determining that one of a virtual object or the predetermined reference location is within a predetermined peripheral range of the line of sight of the user.

3. The method of claim 1, wherein providing the virtual user interface based on the line of sight of the user comprises determining that one of a virtual object or the predetermined reference location intersects with the line of sight of the user.

4. The method of claim 1, wherein the electronic device is a media player.

5. The method of claim 1, wherein providing the virtual user interface based on the field of view of the user comprises determining whether the virtual user interface intersects with a near peripheral view of the user or a far peripheral view of the user.

6. The method of claim 5, the virtual user interface comprising the set of controls associated with the first number of controls when the virtual user interface intersects with the near peripheral view of the user, and comprising the set of controls associated with the second number of controls when the virtual user interface intersects with the far peripheral view of the user.

7. The method of claim 1, wherein the second number of controls has at least one less control than the first number of controls.

8. The method of claim 1, wherein a first view of a control with a function in the set of controls associated with the first number of controls has greater detail than a second view of the control with the function in the set of controls associated with the second number of controls.

9. A system comprising:
   at least one computer processor; and
   a memory storing instructions that, when executed by the at least one computer processor, perform a set of operations for controlling a virtual user interface in a virtual or semi-virtual 3D environment, the set of operations comprising:

determining a characteristic, wherein the characteristic is based on at least one of a field of view of the user or a line of sight of the user, wherein the field of view corresponds to one or more peripheral ranges from the line of sight, and wherein the line of sight corresponds to a direction of a gaze of the user;

based on the characteristic, providing a virtual user interface, wherein the virtual user interface is of a size and displays a set of controls associated with a first layout;

determining a change to at least one of: the field of view of the user or the line of sight of the user; and in response to the change, maintaining the size of the virtual user interface and reconfiguring the set of controls to a second layout, wherein the reconfigured virtual user interface is interactive to enable remote control of an electronic device at a predetermined reference location.

10. The system of claim 9, further comprising:

a head mounted display (HMD), wherein the at least one computer processor is operatively connected to the HMD, wherein the virtual user interface is provided on a display of the HMD.

11. The system of claim 9, wherein providing the virtual user interface displaying the set of controls associated with the first layout based on the field of view of the user comprises determining that one of a virtual object or the predetermined reference location is within a peripheral range of the line of sight of the user.

12. The system of claim 9, wherein providing the virtual user interface displaying the set of controls associated with the first layout based on the line of sight of the user comprises determining that one of a virtual object or the predetermined reference location intersects with the line of sight of the user.

13. The system of claim 9, wherein providing the virtual user interface displaying the set of controls associated with the first layout based on the field of view of the user comprises determining whether the virtual user interface intersects with a near peripheral view of the user or a far peripheral view of the user.

14. The system of claim 13, further comprising:

displaying the set of controls associated with the first layout when the virtual user interface intersects with the near peripheral view of the user; and displaying the set of controls associated with the second layout when the virtual user interface intersects with the far peripheral view of the user.

15. The system of claim 9, wherein the second layout of the set of controls has fewer controls than the first layout of the set of controls.

16. A computer storage non-transitory medium encoding computer executable instructions that, when executed by at least one processor, performs a method comprising:

determining a characteristic, wherein the characteristic is based on at least one of a field of view of a user or a line of sight of the user, wherein the field of view corresponds to one or more predefined peripheral ranges from the line of sight, and wherein the line of sight corresponds to a direction of a gaze of the user;

displaying, in a virtual user interface in a virtual or semi-virtual 3D environment, a set of controls having a first layout based on the characteristic, wherein the virtual user interface has a size and is interactive to enable remote control of an electronic device at a predetermined reference location;

determining a change to the characteristic; and altering the first set of controls in the virtual user interface based on the change, wherein the altering comprises maintaining the size of the virtual user interface and displaying the set of controls in a second layout, wherein the first layout is different from the second layout.

17. The computer storage non-transitory medium of claim 16, wherein the first layout of the set of controls has fewer controls than the second layout of the set of controls.

18. The computer storage non-transitory medium of claim 16, wherein displaying the set of controls having the first layout based on the field of view of the user comprises determining whether the virtual user interface intersects with a near peripheral view of the user or a far peripheral view of the user.

19. The computer storage non-transitory medium of claim 18, further comprising:

displaying the set of controls associated with the first layout when the virtual user interface intersects with the near peripheral view of the user; and displaying the set of controls associated with the second layout when the virtual user interface intersects with the far peripheral view of the user.

20. The computer storage non-transitory medium of claim 16, wherein providing the virtual user interface displaying the set of controls associated with the first layout based on the line of sight of the user comprises determining that one of a virtual object or the predetermined reference location intersects with the line of sight of the user.

\* \* \* \* \*